United States Patent [19]

Kishida et al.

[11] 4,452,941

[45] Jun. 5, 1984

[54] THERMOPLASTIC ACRYLIC RESIN COMPOSITION

[75] Inventors: Kazuo Kishida, Hiroshima, Japan; Akira Hasegawa, Port Washington, N.Y.; Masahiro Sugimori, Ohtake, Japan

[73] Assignee: Mitsubishi Rayon Co., Ltd., Tokyo, Japan

[21] Appl. No.: 500,571

[22] Filed: Jun. 2, 1983

[30] Foreign Application Priority Data

Jun. 7, 1982 [JP] Japan .................................. 57-97158
Jun. 8, 1982 [JP] Japan .................................. 57-98205
Jun. 17, 1982 [JP] Japan .................................. 57-104634

[51] Int. Cl.$^3$ ............................................. C08L 51/06
[52] U.S. Cl. ...................................... 525/66; 524/64; 524/67; 524/71
[58] Field of Search ................... 525/71, 64, 66, 67

[56] References Cited

U.S. PATENT DOCUMENTS

| | | | |
|---|---|---|---|
| 3,804,925 | 4/1974 | Kato et al. | 525/281 |
| 4,052,525 | 10/1977 | Ide et al. | 428/412 |
| 4,242,469 | 12/1980 | Schmitt et al. | 525/71 |

*Primary Examiner*—Allan Lieberman
*Attorney, Agent, or Firm*—Oblon, Fisher, Spivak, McClelland & Maier

[57] ABSTRACT

A novel acrylic thermoplastic resin composition, transparent and excellent in flexibility, consisting of at least two different multi-layer structure polymers. Polymer [I] contains an inner layer of crosslinked acrylic elastomer and an outer layer of acrylic resin, wherein the amount of elastomeric inner layer is minor in comparison with the amount of the resin outer layer; polymer [II] has the same fundamental polymer structure as multi-layer structure polymer [I] except that the amount of crosslinked elastomer inner layer is a major amount as compared to the amount of resin outer layer. It is preferred that an intermediate layer having an intermediate property exist between the inner and outer layers of the multi-layer structure polymers.

11 Claims, No Drawings

THERMOPLASTIC ACRYLIC RESIN COMPOSITION

The present invention relates to a novel thermoplastic acrylic resin composition transparent and excellent in flexibility.

More particularly, the invention relates to a thermoplastic acrylic resin composition transparent and excellent in toughness which can be obtained by blending a multi-layer structure polymer [I] and a multi-layer structure polymer [II], said multi-layer structure polymer [I] being constituted of a layer of crosslinked acrylic elastomer having a glass transition temperature (hereinafter, simply referred to as $T_g$) of 0° C. or lower as its inner layer and a layer of acrylic resin having a $T_g$ of 60° C. or higher as its outer layer wherein the amount of said crosslinked elastomer layer (inner layer) is a minor amount as compared with the amount of said resin layer (outer layer), and said multi-layer structure [II] having the same fundamental polymer structure as multi-layer structure polymer [I] except that the amount of crosslinked elastomer layer (inner layer) is a major amount as compared with the amount of resin layer (outer layer).

Acrylic resins, particularly methyl methacrylate polymers, are known as resins having excellent transparency and weather resistance simultaneously, and are extensively in use as cast molded articles, extrusion molded articles and the like. However, because of its hard and brittle character, methyl methacrylate polymer is not suitable for use as a base material for film and sheet, and in addition it is unusable in products requiring flexibility. Thus, its use is limited and a further development of its use has been limited.

Hitherto, a number of attempts have been made to introduce some rubber component into methyl methacrylate polymer with the aim of improving its toughness and flexibility. However, all these attempts resulted in a great deterioratoin of weather resistance or a large debasement in transparency or appearance, and no attempts have ever succeeded in giving methyl methacrylate polymer toughness and flexibility without sacrificing transparency and weather resistance which are excellent characteristic features of methyl methacrylate polymer.

Further, a few methyl methacrylate type multi-layer structure polymers containing acrylic rubber have also been proposed, and are steadily gaining an acceptance as basic acrylic material for film and sheet. However, in most of these prior multi-layer structure polymers, flexibility and film-formability necessary for base material for film and sheet are delicately balanced with the characteristic weather resistance and transparency of methyl methacrylate polymer by giving a complicated multi-layer structure thereto. Accordingly, these prior arts are limited and poor in the degree of freedom of use. For example, these technique can barely give the polymer flexibility and toughness sufficient to overcome the difficulties in handling it as basic material for film and sheet, and they cannot cope with a mode of use requiring a high flexibility without sacrificing other properties of the polymer, particularly processability, transparency and weather resistance.

In view of above, the present inventors conducted elaborated studies with the aim of obtaining an acrylic polymer capable of having an arbitrary flexibility without sacrificing the characteristic properties of methyl methacrylate polymer such as transparency, weather resistance and the like, and processability. As the result, it was found that this object of the present invention can be achieved by blending at least two multi-layer structure polymers which resemble each other in that they both have a crosslinked elastomer layer (inner layer) and a resin layer (outer layer) as their fundamental structural units and which are greatly different from each other in the proportion of said two layers. Based on this finding, the present invention was accomplished.

Thus, the present invention provides a thermoplastic resin composition consisting of from 1 through 99 parts by weight of at least one multi-layer structure polymer [I] and from 99 through 1 part by weight of at least one multi-layer structure polymer [II], said polymer [I] and polymer [II] having the following structures:

Multi-layer structure polymer [I]:
A multi-layer structure polymer comprising the following (A) and (B):
(A) an inner layer polymer (A) constituted of from 60 through 100 parts by weight of an alkyl acrylate having $C_1$-$C_8$ alkyl group ($A_1$), from 0 through 40 parts by weight of a monomer having copolymerizable double bond ($A_2$), from 0 through 10 parts by weight of a polyfunctional monomer ($A_3$) and from 0.1 through 5 parts by weight, per 100 parts by weight of the sum of ($A_1$) to ($A_3$), of a grafting agent, wherein gel content of said inner layer polymer (A) is 60% by weight or higher and its proportion to said polymer [I] is from 5% by weight through 46% by weight;
(B) an outer layer polymer (B) constituted of from 60 through 100 parts by weight of an alkyl methacrylate having $C_1$-$C_4$ alkyl group ($B_1$) and from 0 through 40 parts by weight of a monomer having copolymerizable double bond ($B_2$), wherein the proportion of said outer layer polymer (B) to said polymer [I] is from 54% by weight through 95% by weight.

Multi-layer structure polymer [II]:
A multi-layer structure polymer comprising the following (A') and (B'):
(A') an inner layer polymer (A') constituted of from 60 through 100 parts by weight of an alkyl acrylate having $C_1$-$C_8$ alkyl group ($A_1'$), from 0 through 40 parts by weight of a monomer having copolymerizable double bond ($A_2'$), from 0 through 10 parts by weight of a polyfunctional monomer ($A_3'$) and from 0.1 through 5 parts by weight, based on 100 parts by weight of the sum of ($A_1'$) to ($A_3'$), of a grafting agent, wherein gel content of said inner layer polymer (A') is 60% by weight or higher and its proportion to said polymer [II] is larger than 46% by weight and not larger than 90% by weight;
(B') an outer layer polymer (B') constituted of from 60 through 100 parts by weight of an alkyl methacrylate having $C_1$-$C_4$ alkyl group ($B_1'$) and from 0 through 40 parts by weight of a monomer having copolymerizable double bond ($B_2'$), wherein the proportion of said outer layer polymer (B') to said polymer [II] is lower than 54% by weight and not lower than 10% by weight.

That is, according to the present invention, a resin composition having a wide range of flexibility and toughness can be obtained without sacrificing transparency, weather resistance, processability and the like by blending, at an arbitrary ratio, a multi-layer structure polymer [I] excellent in transparency, weather resistance and processability in which the proportion of the inner layer mainly composed of alkyl acrylate having $C_1$-$C_8$ alkyl group to the whole of said layer is from 5% through 46% by weight, preferably from 10% through 40% by weight, and a multi-layer structure polymer [II] quite excellent in flexibility and toughness in which the proportion of inner layer to the whole of said layer is larger than 46% and not larger than 90% by weight, preferably from 50% through 80% by weight.

The characteristic feature of the present invention consists in that toughness and flexibility are given to a multi-layer structure polymer [I] having nearly the same polymer structure as that of hitherto proposed acrylic multi-layer structure polymers (U.S. Pat. No. 3,804,925 and U.S. Pat. No. 4,052,525) not by enhancing the proportion of crosslinked elastomer to multi-layer structure polymer [I] but by blending a multi-layer structure polymer [II] having a very high content of crosslinked elastomer thereinto. Although a multi-layer polymer can be made flexible by enhancing its crosslinked elastomer content, such a procedure is usually accompanied by a decrease in processability or a decrease in weather resistance, and it is difficult to give flexibility without deterioration of properties such as processability, weather resistance and the like. Contrariwise, by the process of the invention which comprises blending a multi-layer structure polymer containing a rubber of high rubber characteristics at a high ratio, it is possible to give flexibility and toughness without drop in these properties. Further, if multi-layer structure polymer [I] and multi-layer structure polymer [II] different in particle size and degree of crosslinkage of rubber or degree of polymerization of free polymer are blended together, there can be obtained a thermoplastic resin composition of which properties can widely vary in proportion to the blend ratio. As above, transparency and the like cannot be deteriorated even if a multi-layer structure polymer [I] and a multi-layer structure polymer [II] different in rubber characteristics are blended together, so far as the fundamental polymer structure and constituents of multi-layer structure polymer [I] and multi-layer structure polymer [II] are essentially the same.

Both multi-layer structure polymer [I] and multi-layer structure polymer [II] are a multi-layer structure polymer of which fundamental structural units are a crosslinked elastomer layer constituting the inner layer and a resin layer constituting the outer layer. However, they are greatly different from each other in the proportion of the structural units.

Both the inner polymer (A) constituting multi-layer structure polymer [I] and the inner polymer (A') constituting multi-layer structure polymer [II] are for giving flexibility and toughness to said polymer [I] or [II]. They are both a crosslinked elastomer layer having a $T_g$ of 0° C. or lower, preferably −20° C. or lower, a gel content of 60% by weight or more, preferably 80% by weight of more, and a degree of swelling of 50 or less, preferably 15 or less, which is composed of from 60 through 100 parts by weight, preferably from 80 through 100 parts by weight, of an alkyl acrylate having ($C_1$-$C_8$) alkyl group ($A_1$ or $A_1'$), from 0 through 40 parts by weight, preferably from 0 through 20 parts by weight, of a monomer having copolymerizable double bond ($A_2$ or $A_2'$), from 0 through 10 parts by weight of a polyfunctional monomer ($A_3$ or $A_3'$) and from 0.1 through 5 parts by weight, per 100 parts by weight of the sum of ($A_1$) to ($A_3$) or ($A_1'$) to ($A_3'$), of a grafting agent.

As referred to herein, gel content and degree of swelling are values measured according to the methods mentioned below.

METHODS FOR THE MEASUREMENT OF GEL CONTENT AND DEGREE OF SWELLING

According to JIS K-6388, a predetermined quantity of crosslinked elastomer is sampled out and dipped and swollen in methyl ethyl ketone (hereinafter, simply referred to as "MEK") at 25° C. for 48 hours. Thereafter, it is withdrawn, the adhering MEK is wiped off, and then it is weighed. Then, MEK is evaporated off in an oven under reduced pressure until the test piece reaches a constant weight. Then, the weight of the test piece in absolute dryness is read out, from which degree of swelling and gel content are calculated according to the following equations:

$$\text{Degree of swelling} = \frac{\text{(Weight after being swollen with MEK)} - \text{(Weight in absolute dryness)}}{\text{(Weight in absolute dryness)}}$$

$$\text{Gel content (\%) ("A" method)} = \frac{\text{(Weight in absolute dryness)}}{\text{(Weight of sample taken)}} \times 100$$

With consideration of the balance between flexibility and processability or weather resistance, the proportion of inner layer polymer (A) in the multi-layer structure polymer [I] must be a minor proportion as compared with that of outer layer polymer (B), and it is from 5% through 46% by weight, preferably from 10% through 40% by weight, and more preferably from 20% through 40% by weight. Since multi-layer structure polymer [II] is the component which controls flexibility and toughness, the proportion of inner layer polymer (A') in the multi-layer structure polymer [II] must be a major proportion as compared with that of outer layer polymer (B'), and it is higher than 46% and not higher than 90% by weight, preferably from 50% through 80% by weight.

It is possible to give a double layer structure to inner layer polymer (A) and/or inner layer polymer (A') either by polymerizing one monomer mixture in portions or by forming a core different in composition, degree of crosslinking or the like. These techniques are often advantageous from the viewpoint of polymerization stability or physical properties.

In said polymer (A) layer, the proportion of core component in the inner layer polymer is from 5% through 35% by weight, preferably from 12.5% through 30% by weight. In said polymer (A') layer, it is from 5% through 45% by weight, preferably from 7.5% through 25% by weight.

Although particle sizes of inner layers (A) and (A') are not critical, they are preferably in the range of from 500 Å through 1,500 Å.

The outer layer polymer (B) constituting the multi-layer structure polymer [I] is a component taking charge of weather resistance, processability and the like in the blended composition. It is constituted of from 60 through 100 parts by weight, preferably from 80 through 100 parts by weight, of an alkyl methacrylate having $C_1$ to $C_4$ alkyl group ($B_1$) and from 0 through 40 parts by weight, preferably from 0 through 20 parts by weight, of other monomer having copolymerizable double bond ($B_2$). $T_g$ of said polymer (B) layer itself must be 50° C. or higher, preferably 60° C. or higher. The proportion of said polymer (B) layer in multi-layer structure polymer [I] is from 54% through 95% by weight, preferably from 55% through 85% by weight. If it is less than 54%, sufficient weather resistance and processability can not be given to the blended compositoin.

The outer layer polymer (B') constituting the multi-layer structure polymer [II] is also constituted of from 60 through 100 parts by weight, preferably from 80 through 100 parts by weight, of an alkyl methacrylate having $C_1$ to $C_4$ alkyl group ($B_1'$) and from 0 through 40 parts by weight, preferably from 0 through 20 parts by weight, of other monomer having copolymerizable double bond ($B_2'$), similarly to the above-mentioned polymer (B) layer. However, it has less effect on processability in the blended composition, and it is necessary mainly for preventing a deterioration in transparency and weather resistance of blended composition and for enhancing workaability of composition in the steps of polymerization, coagulation and drying. Therefore, the porportion of said polymer (B') layer in multi-layer structure polymer [II] is a relatively minor proportion, and it is smaller than 54% and not smaller than 10% by weight, preferably from 15% through 45% by weight. If it is smaller than 10% by weight, particular care becomes necessary in the steps of coagulation, drying and the like, and in addition the weather resistance and transparency of the blended composition become lower.

At the time of polymerizing the outer layer polymers (B) and (B'), it is also possible to regulate the degree of polymerization by use of a chain transfer agent, which is rather desirable from the viewpoint of processability and the like in many cases.

The multi-layer structure polymers [I] and [II] used in the present invention contain the abovementioned inner layer polymers (A) and (A') and outer layer polymers (B) and (B'), respectively, as their indispensable structural units. From the viewpoint of transparency and resistance to stress-whitening and of bonding the two layers, an intermediate layer having an intermediate property is preferably allowed to exist between them. Owing to the intervention of intermediate layers (C) or (C'), the properties of the resin to be grafted on the inner layer become closer to the properties of the inner layer, so that the elevation in $T_g$ of inner layer caused by grafting can be prevented, the changes in $T_g$ and composition become smoother and therefore transparency and resistance to stress-whitening are improved.

Both intermediate layer (C) in multi-layer structure polymer [I] and intermediate layer (C') in multi-layer structure polymer [II] are constituted of from 10 through 90 parts by weight, preferably from 30 through 80 parts by weight, and more preferably from 40 through 75 parts by weight, of an alkyl methacrylate having $C_1$ to $C_4$ alkyl group ($C_1$ or $C_1'$), from 90 through 10 parts by weight, preferably from 70 through 20 parts by weight, and more preferably from 60 through 25 parts by weight, of an alkyl acrylate having $C_1$ to $C_8$ alkyl group ($C_2$ or $C_2'$), from 0 through 20 parts by weight of other monomer having copolymerizable double bond ($C_3$ or $C_3'$), from 0 through 10 parts by weight of polyfunctional monomer ($C_4$ or $C_4'$), and from 0.1 through 5 parts by weight, per 100 parts by weight of the sum of ($C_1$) to ($C_4$) or ($C_1'$) to ($C_4'$), of a grafting agent. The proportion of said intermediate layer (C) or (C') in the multi-layer structure polymer [I] or [II] is as follows. Thus, in the multi-layer structure polymer [I], the proportions of inner layer polymer (A) and outer layer polymer (B) to said polymer [I] are from 10 through 40% by weight and from 55 through 85% by weight, respectively, and the proportion of intermediate layer (C) to said polymer [I] is from 5 through 35% by weight, preferably from 5 through 30% by weight and most preferably from 5 through 25% by weight. In the multi-layer structure polymer [II], proportions of inner layer polymer (A') and outer layer polymer (B') to said polymer [II] are from 50 through 80% by weight and from 15 through 45% by weight, respectively, and the proportion of intermediate layer (C') to said polyemr [II] is from 5 through 35% by weight, preferably from 5 through 30% by weight, and most preferably from 5 through 25% by weight. It is indispensable for the effective action of said polymer (C) or (C') layer as an intermediate layer that $T_g$ of said intermediate layer (C) or (C') itself is higher than $T_g$ of inner layer polymer (A) or (A') itself and lower than $T_g$ of outer layer polymer (B) or (B') itself. Further, it is possible to provide the intermediate layer in the form of separate two or more layers, so far as its total amount falls in the above-mentioned range. In such a case, however, the layers must be so constructed that $T_g$ values of the individual layers become higher successively from inner layer to outer layer.

Typical alkyl acrylates having $C_1$ to $C_8$ alkyl group used as the above-mentioned components ($A_1$), ($A_1'$), ($C_2$) and ($C_2'$) include methyl acrylate, ethyl acrylate, propyl acrylate, n-butyl acrylate and 2-ethylhexyl acrylate, and at least one of them is used. Of these monomers, a monomer giving a homopolymer having a lower $T_g$ is more preferable, and n-butyl acrylate is most preferable.

Typical alkyl methacrylate having $C_1$ to $C_4$ alkyl group used as the above-mentioned components ($B_1$), ($B_1'$), ($C_1$) and ($C_1'$) include methyl methcarylate, ethyl methacrylate, propyl methacrylate and butyl methacrylate, and at least one of them is used. Of these monomers, methyl methacrylate is particularly preferable.

As above, multi-layer structure polymers [I] and [II] are constructed fundamentally of an alkyl acrylate having $C_1$ to $C_8$ alkyl group (most preferably, n-butyl acrylate) and an alkyl methacrylate having $C_1$ to $C_4$ alkyl group (most preferably, methyl methacrylate). As the component ($A_2$) or ($A_2'$) constituting the inner layer polymer (A) or (A'), alkyl methacrylates having $C_1$ to $C_4$ alkyl group are still preferable, and as the component ($B_2$) or ($B_2'$) constituting the outer layer polymer (B) or (B'), alkyl acrylates having $C_1$ to $C_8$ alkyl group are still preferable. However, it is also possible to use other monomer having copolymerizable double bond as component ($A_2$) or ($A_2'$), ($B_2$) or ($B_2'$) and ($C_3$) or ($C_3'$), so far as the amount of said other monomer is 20% by weight or less. Examples of said other monomer include (meth)acrylic acid derivatives such as lower alkoxy acrylates, cyanoethyl acrylate, (meth)acrylic acid, (meth)acrylamide and the like, styrenes, (meth)acrylonitrile and the like.

As the polyfunctional monomer used as component ($A_3$) or ($A_3'$) and component ($C_4$) or ($C_4'$), ethylene glycol dimethacrylate, propylene glycol dimethacrylate, 1,3-butylene glycol dimethacrylate, 1,4-butylene glycol dimethacrylate and the like are preferable. Polyfunctional monomers other than the above, such as divinylbenzene, alkylene glycol diacrylate and the like, are also usable. These polyfunctional monomers are used particularly for the purpose of forming a dense crosslinked structure in the crosslinked elastomer layer (A) or (A').

In multi-layer structure polymers [I] and [II], it is necessary to form an effective graft crosslinkage between inner layer and intermediate layer and between intermediate layer and outer layer by using a grafting agent at the time of polymerizing the inner polymer layer (A) or (A') and the intermediate layer (C) or (C'). Usable grafting agents include allyl esters, methallyl esters and crotyl esters of $\alpha,\beta$-unsaturated mono- and di-carboxylic acids, as well as triallyl cyanurate, triallyl isocyanurate and the like. Among them, allyl methacrylate exhibits a particularly excellent effect, and triallyl cyanurate and triallyl isocyanurate exhibit a secondly excellent effect. The amount of grafting agent is important, and it is used in an amount ranging from 0.1 through 5 parts by weight, preferably from 0.5 through 2 parts by weight, per 100 parts by weight of the total weight of the monomers constituting the layer other than the grafting agent. If the amount of grafting agent is less than 0.1 part by weight, the effective amount of graft linkage is too small, so that inter-layer breakage readily takes place when the ultimate polymer is molded, as the result of which transparency and the like are greatly deteriorated. If its amount exceeds 5 parts, the amount of linkage becomes too great, as the result of which flexibility drops and, in addition, processability, particularly flow property, decreases greatly. Particularly in multi-layer structure polymer [I] where a certain amount of free polymer not linked to the inner layer must be exist from the viewpoint of moldability, it is necessary that the amount of grafting agent in intermediate layer falls in the range from 0.5 through 2 parts by weight.

In the multi-layer structure polymers [I] and [II] of the invention, the extent of grafting between inner layer and intermediate layer and between intermediate layer and outer layer is a very important factor. If the amount of grafting is too small, transparency, resistance to stress-whitening, weather resistance and solvent resistance decrease greatly. If the amount of grafting is too large, processability drops, and in addition the composition becomes rigid as a whole and a sufficient flexibility cannot be given to it. As expressed by gel content measured by the following method as a rough measure, appropriate amount of grafting is from 50 through 80% by weight, preferably from 60 through 75% by weight, in multi-layer structure polymer [I], and it is 60% by weight or more, preferably from 70 through 95% by weight, in multi-layer structure polymer [II]. The term "gel content" herein referred to means the summed amount of inner layer itself and the grafting component linked to the inner layer. Although it may be expressed also by degree of grafting, gel content is employed in the present invention as a measure of the amount of grafting, because of the special structures of said polymers [I] and [II].

The "gel content" herein referred to is measured by the following method. Thus, about 0.4 g of multi-layer structure polymer is accurately weighed out and dipped in 40 g of methyl ethyl ketone (MEK) at 25° C. for 24 hours, after which it is centrifuged at 16,000 rpm for 90 minutes by means of a centrifugal machine to separate the fraction insoluble in MEK. The MEK-insoluble fraction thus obtained is thoroughly dried and weighed accurately.

$$\text{gel content} \atop (\% \text{ by weight}) \atop (\text{"}B\text{" method}) = \frac{\text{Weight of MEK-insoluble fraction}}{\text{Weight of sample}} \times 100$$

The acrylic multi-layer structure polymers [I] and [II] can easily be produced by stepwise carrying out the conventional emulsion polymerization process in several stages. Thus, an inner layer polymer is produced first of all by the emulsion polymerization process, after which the next layer is polymerized in the presence of the particles of the inner layer polymer. It is important in this case that no emulsifier capable of forming new polymer particles should be added additionally, or that the monomer added for the purpose of forming the next layer should be grafted on the particles of the already formed inner layer polymer particles and form the next layer only there. Thereafter, the same procedure is repeated to complete the polymerization. The emulsifier, catalyst and the like used for the polymerization are not critical. As the emulsifier, conventional emulsifiers used for emulsion polymerization, such as long chain fatty acid salts, sulfonic acid salts, dialkyl sulfosuccinate, polyoxyethylene alkylphenyl ether and the like, can be used. As the catalyst, water-soluble initiators such as potassium persulfate, oil-soluble initiators such as organic hydroperoxide and the like, and redox type initiators prepared by combining them with a reductant such as sodium formaldehyde sulfoxylate and the like are all usable.

Although particle size of the final polymer is not critical, most well-balanced properties can be achieved when the particle size of final polymer is in the range of about 800 Å to 2,000 Å.

These emulsified latices are optionally mixed with additives such as antioxidant, lubricant and the like, and then salted out, dehydrated, washed and dried, whereby a powdery polymer can be obtained.

Another advantageous production process of the multi-layer structure polymers [I] and [II] is an emulsion-suspension polymerization process which comprises producing inner and intermediate layers by emulsion polymerization process and then producing only the outer layer by suspension polymerization.

Blend ratio of multi-layer structure polymer [I] to multi-layer structure polymer [II] may be arbitrarily selected in the range of [I]/[II]=1/99 though 99/1, according to the intended properties of the composition. A particularly excellent composition can be obtained when the ratio [I]/[II] is in the range from 10/90 through 90/10.

The blending of multi-layer structure polymer [I] and multi-layer structure polymer [II] can be carried out by usual method such as the blending of both powders by means of a Henschel mixer or the like. Alternatively, the blending may also be carried out by a process which comprises mixing together both the latices and then salting out the mixture.

In blending multi-layer structure polymers [I] and [II], general additives such as ultraviolet absorber, antioxidant, pigment, lubricant and the like may be added. Particularly, a resin composition having an additionally excellent weather resistance can be produced by adding an ultraviolet absorber.

By compounding from 1 through 99 parts by weight of the above-mentioned resin composition of the invention consisting of from 1 through 99 parts by weight of at least one multi-layer structure polymer [I] and from 99 through 1 part by weight of at least one multi-layer structure polymer [II] with from 99 through 1 part by weight of at least one polymer selected from the following group (i) or (ii) or with a mixture of at least one polymer selected from group (i) and at least one polymer selected from group (ii), there can be obtained a novel thermoplastic resin composition having various excellent characteristic features.

Polymers (i):

Homopolymers of monomers having the following general formulas (a), (b) or (c) or copolymers consisting of two or more members of these monomers:

$$CH_2=CXY \quad (a)$$

wherein X and Y are either of H, Cl, F, Br, $CH_3$, COOH, $COOCH_3$, CN, $OCOCH_3$, $C_6H_5$, alkoxy group, $OCCH_3$ and $SO_3H$;

$$CF_2=CFZ \quad (b)$$

wherein Z is either of H, F, Cl and $CF_3$; and $$CH_2=C-COOR \quad (c)$$
$$\quad\;|$$
$$\quad CH_3$$

wherein R is fluoroalkyl group.

Polymers (ii):

Polycarbonates, thermoplastic polyesters and polyamides.

As have been mentioned above, the multi-layer structure polymers [I] and [II] of the invention have a special multi-layer polymer structure in which each layer can fully exhibit its characteristic features. Therefore, if they are blended with other thermoplastic resin different in refractive index therefrom but miscible therewith, there can be obtained a resin composition excellent in transparency and showing no stress-whitening at all or showing only a very slight stress-whitening. Particularly when they are blanded with a methyl methacrylate type resin, there can be obtained a resin composition excellent in transparency, resistance to stress-whitening, weather resistance and impact resistance.

It is a surprising fact that stress-whitening takes place only to a very small extent even in a polymer blend system, as above. This is grounded on the effect of the special structure which the multi-layer structure polymers [I] and [II] have, and this cannot be preestimated from the prior method of introducing rubber component.

Further, when they are blended with vinyl chloride resin, polystyrene. As resin or polycarbonate resin, the blended composition of multi-layer structure polymers [I] and [II] acts as a modifier for weather resistance and impact resistance, and brings about a great improvement in weather resistance and impact resistance.

Further, their blended compositions with polyvinylidene fluoride are excellent in weather resistance, transparency, resistance to stress-whitening, chemical resistance, toughness, moldability and the like. Particularly, a resin composition consisting of from 1 through 50 parts by weight of vinylidene fluoride and from 50 through 99 parts by weight of a blended mixture of multi-layer structure polyers [I] and [II] is excellent as an elementary material for the formation of film and gives a transparent film excellent in toughness, weather resistance, resistance to stress-whitening, chemical resistance and the like. By laminating such a film on the surface of usual molded articles, a weather resistance and an ornamental effect can easily be given to the molded article, so that commercial value of the film is very high.

The invention will be illustrated concretely with reference to the following examples, wherein all the parts are by weight and all "%" are by weight.

The abbreviations used in the examples have the following meanings:
MMA: Methyl methacrylate
BuA: Butyl acrylate
2EHA: 2-Ethylhexyl acrylate
St: Styrene
BD: 1,3-Butylene dimethacrylate
TAC: Triallyl cyanurate
AMA: Allyl methacrylate
CHP: Cumene hydroperoxide
SFS: Sodium formaldehyde sulfoxylate
n-OSH: n-Octylmercaptan
GC: Gel content
DS: Degree of swelling Among the values of $T_g$ referred to in the examples, $T_g$ of inner layer was estimated from the peak value of loss elastic modulus in the dynamic visco-elastic measurement, while $T_g$ values of intermediate layer and outer layer were calculated from the $T_g$ values mentioned in, for example, Polymer Handbook according to the following well known for equation:

$$1/T_g = a_1/T_{g1} + a_2/T_{g2}$$

wherein $a_1$ and $a_2$ express weight fractions.

EXAMPLE 1

(1) Preparation of Multi-layer Structure Polymer [I]

Into a reaction vessel equipped with a cooler were charged 250 parts of deionized water, 1 part of sodium salt of sulfosuccinic ester and 0.05 part of sodium formaldehyde sulfoxylate. Temperature of the reaction system was elevated to 70° C., while stirring it under a stream of nitrogen gas. After temperature of the reaction system had reached 70° C., a monomer mixture consisting of 22.5 parts of BuA, 2.5 parts of MMA, 0.25 part of AMA and 0.1%, based on the sum of BuA and MMA, of CHP was dropwise added thereto over 60 minutes, after which the system was kept in the state for an additional 60 minutes to complete the formation of inner polymer (A). The inner polymer (A) thus obtained had a $T_g$ of about $-25°$ C., a particle size of about 1,000 Å, a gel content of 92% as measured according to the prescribed method ("A" method) and a degree of swelling of about 10. Subsequently, a monomer mixture consisting of 6 parts of BuA, 9 parts of MMA, 0.15 part of AMA and 0.1%, based on the sum of BuA and MMA, of CHP was dropwise added over 30 minutes and the system was kept in that state for an additional 30 minutes to form intermediate layer (C) ($T_g \approx 19°$ C.). Subsequently, a monomer mixture consisting of 3 parts of BuA, 57 parts of MMA, 0.12 part of n-OSH and 0.1%, based on the sum of BuA and MMA, of CHP was dropwise added over 60 minutes and the system was kept in that state for an additional 60 minutes to form outer layer polymer (B) ($T_g \approx 88°$ C.). Thus, multi-layer structure polymer [I-(1)] was obtained. After the polymerization, the multi-layer structure polymer was sampled and examined under electron microscope to confirm that no new particle was formed at the time of polymerizing individual layers and a perfect seed polymerization took place. The latex thus obtained was salted out in the usual way, filtered, washed and then thoroughly dried to obtain a dry powder.

(2) Preparation of Multi-layer Structure Polymer [II]

By just the same procedure as in the case of multi-layer structure polymer [I], a dry powder of multi-layer structure polymer [II-(1)] was obtained of which polymer structure was constituted of an inner layer polymer (A') ($T_g \approx -25°$ C.) prepared by adding and polymerizing 54 parts of BuA, 6 parts of MMA, 0.6 part of AMA and 0.1%, based on the sum of BuA and MMA, of CHP, an intermediate layer (C') ($T_g \approx 19°$ C.) prepared by adding and polymerizing 6 parts of BuA, 9 parts of MMA, 0.15 part of AMA and 0.1%, based on the sum of BuA and MMA, of CHP and an outer layer polymer (B') ($T_g \approx 88°$ C.) prepared by adding and polymerizing 1.25 parts of BuA, 23.75 parts of MMA, 0.05 parts of N-OSH and 0.1%, based on the sum of BuA and MMA, of CHP.

This multi-layer structure plymer [II-(1)] had a gel content of 91% as measured according to the prescribed method ("A" method) and a degree of swelling of 10. Its particle size was adjusted to about 1,000 Å by using the sodium salt of sulfosuccinic ester in an amount of 1.5 parts.

After drying the pellet thus obtained for 24 hours at 70° C., it was tested for moldability by the use of an injection molding machine. The results are shown in Table 1. The criterion for the evaluation of moldability was as follows.

[Criterion for the Evaluation of Moldability]
o: Readily moldable by means of injection molding machine
Δ: Barely moldable by means of injection molding machine
x: Difficult to mold with injection molding machine.
These expressions are consistently used throughout the following examples and comparative examples.

Using the same pellet as above, a sheet having a thickness of 250μ was formed by T-die method, and the sheet thus obtained was examined for tensile elastic modulus as a measure of flexibility. Further, transparency of this sheet was assessed according to JIS K 6714. The results of the measurements are shown in Table 1.

Further, the sheet was subjected to an accelerated exposure test for 2,000 horus by means of sunshine weather-o-meter, and maintenance of elongation was calculated from tensile breakage elongatoins before and after the exposure to assess weather resistance. The results of the measurement are shown in Table 1. It is apparent from these data that blending of a polymer having a high rubber content brings about no marked drop in weather resistance.

TABLE 1

|  |  | Compounding ratio of resins [I-(1)]/[II-(1)] (parts) | Transparency Total light transmittance (%) | Haze (%) | Moldability | Flexibility Tensile (elastic modulus) (kg/cm$^2$) | Weather resistance (Maintenance of tensile elongation) (%) |
|---|---|---|---|---|---|---|---|
| Example of the present invention | (1) | 90/10 | 89 | 5.9 | o | 1000 | 39 |
|  | (2) | 70/30 | 88 | 6.4 | o | 1000 | 37 |
|  | (3) | 50/50 | 89 | 6.1 | o | 3000 | 38 |
|  | (4) | 30/70 | 88 | 6.2 | o | 3000 | 34 |
|  | (5) | 10/90 | 87 | 6.4 | o | 4000 | 33 |
| Comparative example | (1) | 100/0 | 90 | 6.3 | o | 0000 | 91 |
|  | (2) | 0/100 | — | — | Δ | — | — |

(3) Preparation and Evaluation of Resin Composition

Multi-layer structure polymer [I-(1)] and multi-layer structure polymer [II-(1)] were mixed together in the proportion shown in Table 1. Then, 2 parts of an ultraviolet absorber (trade name "Tinuvin P", manufactured by Ciba-Geigy A.G.) was added and thoroughly homogenized. The resulting mixture was pelletized by means of an extruder.

EXAMPLE 2

By just the same procedure as in Example 1, multi-layer structure polymers [I-(2)] to [I-(4)] and multi-layer structure polymers [II-(2)] to [II-(4)] shown in Table 2 were prepared. Further, comparative polymers (1) and (2) shown in Table 2 were prepared by a similar procedure.

These polymers were blended in the proportions shown in Table 3, and the blended compositions were evaluated by the same procedure as in Example 1.

TABLE 2

| Polymer |  | Inner layer polymer Monomer composition (parts) | Gel* content (% by wt.) | Degree of swelling | Tg (°C.) | Intermediate layer Monomer composition (1) (parts) | Monomer composition (2) (parts) | Tg (1) | Tg (2) |
|---|---|---|---|---|---|---|---|---|---|
| Multi-layer structure polymer [I] | [I-(2)] | BuA/MMA/BD/AMA = 26.7/3/0.3/0.15 | 91 | 10 | −25 |  |  |  |  |
|  | [I-(3)] | BuA/BD/AMA = 29/1/0.15 | 91 | 11 | −35 | MMA/BuA/AMA = 10/10/0.1 |  | 4 | — |
|  | [I-(4)] | BuA/BD/AMA = 24/1/0.1 | 93 | 10 | −35 | MMA/BuA/AMA = 5/10/0.075 | MMA/BuA/AMA = 10/5/0.075 | −20 | 31 |
| Comparative polymer | (1) | BuA/BD = 29/1 | 92 | 12 | −35 | MMA/BuA = 10/10 |  | 4 | — |
| Multi-layer structure polymer [II] | [II-(2)] | BuA/MMA/BD/AMA = 63/5/2/0.35 | 90 | 10 | −30 |  |  |  |  |
|  | [II-(3)] | BuA/BD/AMA | 91 | 11 | −35 | MMA/BuA/AMA |  | 4 | — |

TABLE 2-continued

| | | | | | | Outer layer | | |
| --- | --- | --- | --- | --- | --- | --- | --- | --- |
| | | | | | | = 5/5/0.1 | | |
| | [II-(4)] | BuA/BD/AMA = 58/2/0.3 = 53/2/0.11 | 91 | 10 | −35 | MMA/BuA/AMA = 5/10/0.075 | MMA/BuA/AMA = 10/5/0.075 | −20  31 |
| Comparative polymer | (2) | BuA/BD = 58/2 | 90 | 11 | −35 | MMA/BuA = 5/5 | | 4  — |

| | | Polymer | Monomer composition (parts) | Tg | Gel** content (%) |
| --- | --- | --- | --- | --- | --- |
| Multi-layer structure polymer [I] | [I-(2)] | | MMA/BuA = 63/7 | 79 | 62 |
| | [I-(3)] | | MMA/BuA = 40/10 | 57 | 69 |
| | [I-(4)] | | MMA/BuA = 42.75/2.25 | 88 | 73 |
| Comparative polymer | (1) | | MMA/BuA = 40/10 | 57 | 32 |
| Multi-layer structure polymer [II] | [II-(2)] | | MMA = 30 | 105 | 85 |
| | [II-(3)] | | MMA/BuA = 27/3 | 79 | 83 |
| | [II-(4)] | | MMA = 15 | 105 | 93 |
| Comparative polymer | (2) | | MMA/BuA = 27/3 | 79 | 58 |

Note:
(1) Comparative polymers (1) and (2) have no graft-linkage
(2) *according to "A" method
(3) **according to "B" method

TABLE 3

| | | Compounding ratio of resins (parts) | Transparency | | Moldability | Flexibility (Tensile elastic modulus) (kg/cm²) | Weather resistance (Maintenance of tensile elongation) (%) |
| --- | --- | --- | --- | --- | --- | --- | --- |
| | | | Total light transmittance (%) | Haze (%) | | | |
| Example of the present invention | (6) | [I-(2)]/[II-(2)] = 70/30 | 87 | 6.5 | o | 6500 | 88 |
| | (7) | [I-(3)]/[II-(3)] = 70/30 | 90 | 5.8 | o | 7000 | 90 |
| | (8) | [I-(4)]/[II-(4)] = 70/30 | 89 | 5.7 | o | 7500 | 91 |
| | (9) | [I-(3)]/[II-(2)] = 70/30 | 84 | 7.2 | o | 7000 | 90 |
| Comparative Examples | (3) | (1)/(2) = 70/30 | hazy | | x | — | — |
| | (4) | (1)/[II-(3)] = 70/30 | " | | Δ | 6000 | 45 |
| | (5) | [I-(3)]/(2) = 70/30 | " | | x | — | — |
| | (6) | [I-(2)]/[I-(3)] = 70/30 | 91 | 6.4 | o | 10000 | 91 |
| | (7) | [II-(2)]/[II-(3)] = 70/30 | hazy | | Δ | — | — |

EXAMPLE 3

(1) Preparation of Multi-layer Structure Polymer [I]

Into a polymerization vessel equipped with a cooler were charged 250 parts of deionized water, 2 parts of sodium salt of sulfosuccinic ester and 0.05 part of SFS, and they were stirred under a stream of nitrogen gas. Thereafter, a mixture consisting of 1.6 parts of MMA, 8 parts of BuA, 0.4 parts of BD, 0.1 part of AMA and 0.04 part of CHP was charged. After elevating the temperature to 70° C., the reaction was continued for 30 minutes to complete the formation of core part of inner polymer (A). Subsequently, a mixture consisting of 1.5 parts of MMA, 22.5 parts of BuA, 1 part of BD, 0.25 part of AMA and 0.05%, based on the weight of the sum of these monomers, of CHP was added over 60 minutes and then the system was kept in that state for an additional 60 minutes to form a double-layer crosslinked elastomer consisting of a core and a main crosslinked elastomer part. The double-layer crosslinked elastomer thus obtained had a degree of swelling of 10.0 in MEK and a gel content of 90% as measured according to the prescribed method ("A" method).

Subsequently, a mixture consisting of 5 parts of MMA, 5 parts of BuA and 0.1 part of AMA, corresponding to intermediate layer (C), was added and polymerized over 10 minutes, and finally a mixture consisting of 52.25 parts of MMA and 2.75 parts of BuA was similarly polymerized to form an outer layer polymer (B). Thus, a multi-layer structure polymer [I -(5)] was obtained. In the reactions for forming intermediate layer (C) and outer layer (B), CHP was used in an amount corresponding to 0.1% of the total amount of monomers used in every layer.

In the same manner as above, multi-layer structure polymers [I-(6)] to [I-(9)] and comparative polymers (3), (4) and (5) were formed.

In all the polymers, the final particle size was in the range from 1,000 Å to 1,500 Å.

These polymer latices were salted out in the usual way and then washed, dehydrated and dried to obtain dry powders.

Their compositions and properties are shown in Table 4.

(2) Preparation of Multi-layer Structure Polymer [II]

In just the same manner as in Example 1, multi-layer structure polymers [II-(5)] to [II-(8)] and comparative polymer (6) having the composition shown in Table 5 were prepared.

In all the polymers thus obtained, particle size was in the range of 1,000 Å to 2,000 Å.

(3) Preparation and Evaluation of Resin Composition

Multi-layer structure polymers [I-(5)] and [II-(6)] were blended together in the proportions shown in Table 6, to which was added 2 parts of an ultraviolet absorber trade name ("Tinuvin P", manufactured by Ciba-Geigy A.G.). After throughly homogenizing the mixture, it was evaluated in just the same manner as in Example 1.

Results of the evaluation were shown in Table 6, from which it is apparent that the blending of multi-layer structure polymer [II] having a high rubber content brings about no marked decrease in transparency and weather resistance, even though it brings about a drop in tensile elastic modulus.

Further, multi-layer structure polymers [I-(5)] to [I-(9)] and [II-(5)] to [II-(8)] and comparative polymers (3) to (6) were blended in the proportions shown in Table 7 and the blended compositions were evaluated similarly.

Results of the evaluation are shown in Table 7, from which it is apparent that all the products of the present invention are excellent in transparency, weather resistance and moldability and have an appropriate flexibility.

TABLE 4

| | | Inner layer polymer (A) | | | | |
|---|---|---|---|---|---|---|
| | | Core polymer | Main crosslinked elastomer layer | Gel* content | Degree of swelling | Tg (°C.) |
| Multi-layer structure polymer [I] | [I-(5)] | MMA/BuA/BD/AMA = 1.6/8/0.4/0.1 | MMA/BuA/BD/AMA = 1.5/22.5/1.0/0.25 | 92 | 6 | −30 |
| | [I-(6)] | MMA/BuA/BD/AMA = 5.6/4/0.4/0.1 | MMA/BuA/BD/AMA = 1.5/22.5/1.0/0.25 | 93 | 6 | −25 |
| | [I-(7)] | MMA/2EHA/BD/AMA = 1.6/8/0.4/0.1 | MMA/2EHA/BD/AMA = 1.5/22.5/1.0/0.25 | 90 | 7 | −50 |
| | [I-(8)] | MMA/St/BuA/BD/AMA = 1.28/0.32/8/0.4/0.1 | MMA/St/BuA/BD/AMA = 1.2/0.3/22.5/1.0/0.25 | 91 | 6 | −30 |
| | [I-(9)] | MMA/BuA/BD/AMA = 1.6/8/0.4/0.1 | MMA/BuA/BD/AMA = 1.5/22.5/1.0/0.25 | 92 | 6 | −30 |
| Comparative polymer | (3) | MMA/BuA/BD = 1.6/8/0.4 | MMA/BuA/BD = 1.5/22.5/1.0 | 90 | 7 | −30 |
| | (4) | — | MMA/BuA/BD/AMA = 7.8/21/1.2/0.25 | 91 | 5 | −20 |
| | (5) | MMA/BuA/BD/AMA = 1.6/8/0.4/0.1 | MMA/BuA/BD/AMA = 1.5/22.5/1.0/0.25 | 90 | 6 | −30 |

| | | Intermediate layer (C) | | | | Outer layer polymer (B) | Tg of layer (C) itself | Gel** content (%) |
|---|---|---|---|---|---|---|---|---|
| | | (C-I) | Tg (°C.) | (C-II) | Tg (°C.) | | | |
| Multi-layer structure polymer [I] | [I-(5)] | MMA/BuA/AMA = 5/5/0.1 | 4 | — | — | MMA/BuA = 52.25/2.75 | 88 | 57 |
| | [I-(6)] | MMA/BuA/AMA = 5/5/0.1 | 4 | — | — | MMA/BuA = 52.25/2.75 | 88 | 55 |
| | [I-(7)] | MMA/2EHA/AMA = 5/5/0.1 | 4 | — | — | MMA/2EHA = 52.25/2.75 | 88 | 56 |
| | [I-(8)] | MMA/St/BuA/AMA = 4/1/5/0.1 | 4 | — | — | MMA/St/BuA = 41.8/10.45/2.75 | 88 | 53 |
| | [I-(9)] | MMA/BuA/AMA = 2/3/0.05 | −10 | MMA/BuA/AMA = 3/2/0.05 | 19 | MMA/BuA = 52.25/2.75 | 88 | 58 |
| Comparative polymer | (3) | MMA/BuA = 5/5 | 4 | — | — | MMA/BuA = 52.25/2.75 | 88 | 40 |
| | (4) | MMA/BuA = 10/10 | 4 | — | — | MMA/BuA = 45/5 | 79 | 48 |
| | (5) | MMA/BuA/AMA = 5/5/0.1 | 4 | — | — | MMA/BuA = 41.25/13.75 | 47 | 58 |

Note:
(1) Comparative Polymer (3) has no graft-linkage
(2) Comparative Polymer (4) has no graft-linkage between layers (C) and (B).
(3) *according to "A" method.
(4) **according to "B" method.

TABLE 5

| | Inner layer polymer (A) | | | Intermediate layer (C) | | | |
|---|---|---|---|---|---|---|---|
| | | Gel* content (% by wt.) | Degree of swelling | Tg (°C.) | (C'-1) | | (C-2) | |
| Composition | | | | | Composition | Tg (°C.) | Composition | Tg (°C.) |

TABLE 5-continued

| | | | | | | | | | |
|---|---|---|---|---|---|---|---|---|---|
| Multi-layer structure polymer | [II-(5)] | BuA/BD/AMA = 48/2/0.2 | 92 | 9 | −35 | MMA/BuA/AMA = 6/9/0.075 | −10 | MMA/BuA/AMA = 9/6/0.075 | 19 |
| | [II-(6)] | BuA/MMA/BD/AMA = 55/3/2/0.24 | 91 | 10 | −30 | MMA/BuA/AMA = 5/5/0.05 | 4 | | |
| | [II-(7)] | 2EHA/MMA/BD/AMA = 55/3/2/0.24 | 89 | 11 | −30 | MMA/2EHA/AMA = 5/5/0.05 | 4 | | |
| | [II-(8)] | BuA/MMA/BD/AMA = 53/5/2/0.3 | 91 | 10 | −27 | | | | |
| Comparative polymer | (6) | BuA/MMA/BD = 55/3/2 | 90 | 10 | −30 | MMA/BuA = 5/5 | 4 | | |

| | | Outer layer polymer (B) | | Gel** |
|---|---|---|---|---|
| | | Composition | Tg (°C.) | content (%) |
| Multi-layer structure polymer | [II-(5)] | MMA = 20 | 105 | 90 |
| | [II-(6)] | MMA/BuA = 28.5/1.5 | 88 | 84 |
| | [II-(7)] | MMA/2EHA = 28.5/1.5 | 88 | 82 |
| | [II-(8)] | MMA/BuA = 36/4 | 79 | 79 |
| Comparative polymer | (6) | MMA/BuA = 28.5/1.5 | 88 | 59 |

Note:
(1) Comparative polymer (6) has no graft-linkage
(2) *according to "A" method.
(3) **according to "B" method.

TABLE 6

| | | Compounding ratio of resins [I-(5)]/[II-(6)] (parts) | mold-ability | Transparency | | Flexibility (Tensile elastic modulus) (kg/cm²) | Weather resistance (Maintenance of tensile elongation) (%) |
|---|---|---|---|---|---|---|---|
| | | | | Total light transmittance (%) | Haze (%) | | |
| Example of the present invention | (10) | 90/10 | o | 89 | 4.2 | 8500 | 91 |
| | (11) | 70/30 | o | 90 | 4.5 | 7500 | 88 |
| | (12) | 50/50 | o | 87 | 5.1 | 6500 | 84 |
| | (13) | 30/70 | o | 88 | 5.2 | 5000 | 82 |
| | (14) | 10/90 | o | 86 | 5.4 | 4500 | 80 |
| Comparative example | (8) | 100/0 | o | 93 | 3.7 | 10000 | 94 |
| | (9) | 0/100 | Δ | Considerably high transparency | | — | — |

TABLE 7

| | | Compounding ratio of resins (parts) | Mold-ability | Transparency | | Flexibility (Tensile elastic modulus) (kg/cm²) | Weather resistance (Maintenance of tensile elongation) (%) |
|---|---|---|---|---|---|---|---|
| | | | | Total light transmittance (%) | Haze (%) | | |
| Example of the present invention | (15) | [I-(5)]/[II-(5)] = 70/30 | o | 89 | 4.2 | 7,000 | 92 |
| | (16) | [I-(6)]/[II-(6)] = 70/30 | o | 91 | 4.3 | 6,500 | 91 |
| | (17) | [I-(7)]/[II-(7)] = 70/30 | o | 89 | 4.5 | 6,500 | 90 |
| | (18) | [I-(8)]/[II-(6)] = 70/30 | o | 86 | 5.4 | 6,500 | 90 |
| | (19) | [I-(9)]/[II-(8)] = 70/30 | o | 88 | 4.7 | 6,500 | 88 |
| Comparative example | (10) | [I-(5)]/[I-(6)] = 70/30 | o | 93 | 3.8 | 10,000 | 95 |
| | (11) | [II-(4)]/[II-(6)] = 70/30 | Δ | Considerably high transparency | | — | — |
| | (12) | Comparative (3)/ Comparative (6) = 70/30 | x | Opaque | | — | — |
| | (13) | Comparative (3)/[I-(6)] = 70/30 | x | Translucent | | — | — |
| | (14) | Comparative (4)/[I-(6)] = 70/30 | Δ | Translucent | | — | — |
| | (15) | Comparative (5)/[I-(6)] = 70/30 | o | 85 | 7.1 | 5,500 | 42 |
| | (16) | [I-(5)]/Comparative (6) = 70/30 | Δ | Translucent | | — | — |

EXAMPLE 4

(1) Preparation of Multi-layer Structure Polymer [II]

In just the same manner as in Example 3-(1), the multi-layer structure polymers [II-(9)] to [II-(13)] and comparative polymer (7) shown in Table 8 were prepared.

In all these polymers, the final particle size was in the range of 1,000 Å to 1,500 Å.

These polymer latices were salted out in the usual way, washed, dehydrated and dried to obtain dry powders.

Their compositions and properties are shown in Table 8.

(2) Preparation and Evaluation of Resin Compositions

The multi-layer structure polymers [I-(5)] to [(I-(9)] and comparative polymers (3), (4) and (5) obtained in Example 3 were blended with the multi-layer structure polymers [II-(9)] to [II-(13)] and comparative polymer (7) obtained in Example 4-(1) in the proportions shown in Table 9, and the blended compositions were evaluated in the same manner as in Example 1.

All the products of the present invention are excellent in transparency and weather resistance and have appropriate flexibility and processability simultaneously.

TABLE 8

| | | Inner layer polymer (A') | | | | |
|---|---|---|---|---|---|---|
| | | Composition of core | Composition of main part | Gel* content (% by wt.) | Degree of swelling | Tg (°C.) |
| Multi-layer structure polymer (II) | [II-(9)] | MMA/BuA/BD/AMA = 1.6/8/0.4/0.1 | MMA/BuA/BD/AMA = 3/44.5/2/0.5 | 92 | 6.3 | −30 |
| | [II-(10)] | MMA/BuA/BD/AMA = 5.6/4/0.4/0.1 | MMA/BuA/BD/AMA = 3/44.5/2/0.5 | 91 | 5.8 | −25 |
| | [II-(11)] | MMA/2EHA/BD/AMA = 1.6/8/0.4/0.1 | MMA/2EHA/BD/AMA = 3/45/2/0.5 | 90 | 6.7 | −30 |
| | [II-(12)] | MMA/St/BuA/BD/AMA = 1.28/0.32/8/0.4/0.1 | MMA/St/BuA/BD/AMA = 2.4/0.6/45/2/0.5 | 91 | 6.2 | −30 |
| | [II-(13)] | MMA/BuA/BD/AMA = 1.6/8/0.4/0.1 | MMA/BuA/BD/AMA = 3/45/2/0.5 | 91 | 6.5 | −30 |
| Comparative polymer | (7) | MMA/BuA/BD = 1.6/8/0.4 | MMA/BuA/BD = 3/45/2 | 89 | 7.5 | −30 |

| | | Intermediate layer (C') | | | | Outer layer polymer (B') | Tg of layer (B') itself (°C.) | Gel** content (%) |
|---|---|---|---|---|---|---|---|---|
| | | (C'-I) | (C'-II) | Tg (C'-I) (°C.) | Tg (C'-II) (°C.) | | | |
| Multi-layer structure polymer (II) | [II-(9)] | MMA/BuA/AMA = 5/5/0.1 | — | 4 | | MMA/BuA = 28.5/1.5 | 88 | 87 |
| | [II-(10)] | MMA/BuA/AMA = 5/5/0.1 | — | 4 | | MMA/BuA = 28.5/1.5 | 88 | 86 |
| | [II-(11)] | MMA/2EHA/AMA = 5/5/0.1 | — | 4 | | MMA/2EHA = 28.5/1.5 | 88 | 85 |
| | [II-(12)] | MMA/St/BuA/AMA = 4/1/5/0.1 | — | 4 | | MMA/St/BuA = 22.8/5.1/1.5 | 88 | 86 |
| | [II-(13)] | MMA/BuA/AMA = 2/3/0.05 | MMA/BuA/AMA = 3/2/0.05 | −10 | 19 | MMA/BuA = 28.5/1.5 | 88 | 87 |
| Comparative polymer | (7) | MMA/BuA = 5/5 | — | 4 | | MMA/BuA = 28.5/1.5 | 88 | 89 |

Note:
(1) Comparative polymer (7) has no graft-linkage.
(2) *according to "A" method.
(3) **according to "B" method.

TABLE 9

| | | Compounding ratio of resins (parts) | Moldability | Transparency Total light transmittance (%) | Haze (%) | Tensile elastic modulus (kg/cm²) | Maintenance of tensile elongation (%) |
|---|---|---|---|---|---|---|---|
| Example of the present invention | (20) | [I-(5)]/[II-(11)] = 70/30 | o | 88 | 4.7 | 7000 | 92 |
| | (21) | [I-(6)]/[II-(10)] = 70/30 | o | 92 | 4.0 | 7000 | 93 |
| | (22) | [I-(7)]/[II-(11)] = 70/30 | o | 90 | 4.3 | 7000 | 91 |
| | (23) | [I-(8)]/[II-(12)] = 70/30 | o | 90 | 4.5 | 7000 | 92 |
| | (24) | [I-(9)]/[II-(13)] = 70/30 | o | 91 | 4.2 | 7000 | 94 |
| Comparative example | (17) | [I-(5)]/[I-(6)] = 70/30 | o | 93 | 3.8 | 10000 | 95 |
| | (18) | [II-(9)]/[II-(10)] = 70/30 | Δ | Considerably high transparency | — | — | — |
| | (19) | Comparative (3)/Comparative (7) = 70/30 | x | Opaque | — | — | — |
| | (20) | Comparative (3)/[II-(9)] = 70/30 | x | Translucent | — | — | — |
| | (21) | Comparative (4)/[II-(9)] = 70/30 | Δ | Translucent | — | — | — |
| | (22) | Comparative (5)/[II-(9)] = 70/30 | o | 87 | 5.5 | 5000 | 51 |

TABLE 9-continued

| Compounding ratio of resins (parts) | Mold-ability | Transparency Total light transmittance (%) | Haze (%) | Tensile elastic modulus (kg/cm$^2$) | Maintenance of tensile elongation (%) |
| --- | --- | --- | --- | --- | --- |
| (23) [I-(5)]/Comparative (7) = 70/30 | Δ | Translucent | — | — | — |

EXAMPLE 5

(1) Preparation of Multi-layer Structure Polymer [I]

Into the same reaction vessel as used in Example 1 were charged 250 parts of deionized water, 2 parts of sodium salt of sulfosuccinic ester and a monomer mixture consisting of 30 parts of BuA, 0.5 part of TAC and 0.015 part of CHP. After sufficiently replacing the inner atmosphere of the reaction vessel with nitrogen, temperature was elevated to 40° C. while stirring the content. When temperature of the reaction mixture reached 40° C., 0.05 part of SFS was added to start the reaction. The reaction mixture was kept in that state for about 120 minutes to complete the formation of inner layer polymer (A). The inner polymer (A) had a gel content of 91% as measured according to the prescribed method ("A" method) and a degree of swelling of 18, and its $T_g$ was estimated at about −40° C. from the data of viscoelasticity measurement.

Then, after elevating the temperature of reaction system to 75° C. and adding 0.05 part of SFS, a mixture consisting of 6 parts of MMA, 4 parts of BuA and 0.1 parts of TAC, used for forming intermediate layer (C), was added over 30 minutes. Thereafter, the reaction mixture was kept in that state for an additional 30 minutes to form intermediate layer (C).

Finally, a mixture consisting of 57 parts of MMA and 3 parts of BuA was similarly polymerized to form outer layer (B). Thus, a latex of multi-layer structure polymer [I-(10)] was obtained. In the reactions for forming intermediate layer (C) and outer layer (B), CHP was used in an amount corresponding to 0.1% of the total amount of monomers used in every layer.

This multi-layer structure polymer [I-(10)] had a final particle size of about 1,300 Å and a gel content of 65% as measured according to prescribed method ("B" method). Calculated $T_g$ values of the intermediate layer and the outer layer were about 19° C. and 88° C., respectively.

The polymer latex was salted out in the usual way, washed, dehydrated and dried to obtain a dry powder.

(2) Preparation of Multi-layer Structure Polymer [II]

By repeating the procedure of Example 5-(1), a multi-layer structure polymer [II-(14)] having the following composition and properties was prepared:
Inner layer (A): BuA 60 parts, TAC 0.3 part; GC=89%, DS=35, $T_g$=−40° C.
Intermediate layer (C): MMA 7.5 parts, BuA 7.5 parts, TAC 0.15 part; $T_g$≈4° C.
Outer layer (B): MMA 25 parts; $T_g$=105° C.

This multi-layer structure polymer [II-(14)] had a final particle size of about 1300 Å and a gel content of 85% as measured according to the prescribed method ("B" method).

(3) Preparation and Evaluation of Resin Composition

A blended composition consisting of 70 parts of multi-layer structure polymer [I-(10)], 30 parts of multi-layer structure polymer [II-(14)] and 2 parts of an ultraviolet absorber (trade name "Tinuvin P", manufactured by Ciba-Geigy A. G.) was evaluated in the same manner as in Example 1.

The composition had a good moldability, and a sheet produced therefrom by T-die method, having a thickness of 250μ, had a total light transmittance of 87% and a haze value of 5.8, demonstrating its good transparency. Having a tensile elastic modulus of 6,500 kg/cm$^2$, this sheet was flexible to an appropriate extent. Its maintenance of tensile elongation was 88% as measured after exposure for 2,000 hours in sunshine weather-o-meter, demonstrating its high weather resistance.

EXAMPLE 6

Fifty parts of a resin composition consisting of 70 parts of the multi-layer structure polymer [I-(5)] and 30 parts of the multi-layer structure polymer [II-(6)], both synthesized in Example 3, was blended with 50 parts of a MMA/MA copolymer (MMA/MA=99/1 by weight, $\eta_{sp}/C$=0.60 as measured at a concentration of 0.10 g/dl) by means of Henschel mixer, and then the blended composition was pelletized by means of an extruder.

After drying the pellet thus obtained for 24 hours at 80° C., it was formed into a sheet having a thickness of 0.5 mm by the use of T-die. The blended polymer had a good sheet-formability, and the sheet formed therefrom was excellent in transparency and gloss. Further, the same pellet as above was injection-molded to obtain an injection-molded plate having a thickness of 2 mm. The molded plate thus obtained was examined on total light transmittance and Dynstat impact strength. As the result, total light transmittance was a high as 91%, and Dynstat impact strength was as high as 34 kg·cm/cm$^2$.

Further, the above-mentioned molded plate was subjected to an accelerated exposure test for 3,000 hours by means of shunshine weather-o-meter to measure maintenance of gloss. As the result, maintenance of gloss was as high as 92%, demonstrating the excellency of the product of the present invention in weathr resistance.

EXAMPLE 7

Sixty parts of the multi-layer structure polymer [I-(5)] and 30 parts of the multi-layer structure polymer [II-(6)], both synthesized in Example 3, were blended together with 10 parts of polyvinylidene fluoride (trade name "Kynar ®500", manufactured by Pennwalt Corp.) by means of Henschel mixer, and the blended composition was pelletized by means of a screw type extruder. The pellet thus obtained was formed into a film having a thickness of 80μ by the inflation process.

The film thus obtained was examined for tensile strength and elongation according to JIS Z 170-2 and on haze according to ASTM-D1003-61. As the result, tensile elastic modulus was 7.5×10$^2$ kg/cm$^2$, strength at break was 335 kg/cm$^2$, elongation at break was 190% and haze was 5.1%, which were all very good values.

The sheet thus obtained was laminated on a zinc-plated 0.5 mm cold-rolled steel plate by the use of a binder, and the laminated sample was subjected to Du Pont impact test (R of tip=½ inch, load 1 kg, falling height 50 cm, temperature 20° C.). The impacted part showed no whitening at all nor cracks.

Further, the film was subjected to an accelerated exposure test for 3,000 hours by means of sunshine weather-o-meter, and the exposed sample was examined on tensile strength and elongation. Maintenance of tensile elongation of the exposed sample (elongation of unexposed sample was taken as 100; a measure of weather resistance) was 89%, demonstrating that the product of the invention is excellent in weather resistance, too.

What is claimed is:

1. A thermoplastic resin composition consisting of from 1 through 99 parts by weight of at least one multi-layer structure polymer [I] and from 99 through 1 part by weight of at least one multi-layer structure polymer [II], said polymer [I] and polymer [II] having the following structures:

multi-layer structure polymer [I]:
a particulate multi-layer structure polymer comprising the following (A) and (B):
(A) an inner layer polymer (A) constituted of from 60 through 100 parts by weight of an alkyl acrylate having $C_1$–$C_8$ alkyl group ($A_1$), from 0 through 40 parts by weight of a monomer having copolymerizable double bond ($A_2$), from 0 through 10 parts by weight of a polyfunctional monomer ($A_3$) and from 0.1 through 5 parts by weight, per 100 parts by weight of the sum of ($A_1$) to ($A_3$), of a grafting agent, wherein gel content of said inner layer polymer (A) is 60% by weight or higher and its proportion to said polymer [I] is from 5% by weight through 46% by weight;
(B) an outer layer polymer (B) constituted of from 60 through 100 parts by weight of an alkyl methacrylate having $C_1$–$C_4$ alkyl group ($B_1$) and from 0 through 40 parts by weight of a monomer having copolymerizable double bond ($B_2$), wherein the proportion of said outer layer polymer (B) to said polymer [I] is from 54% by weight through 95% by weight;

multi-layer structure polymer [II]:
a particulate multi-layer structure polymer comprising the following (A') and (B'):
(A') an inner layer polymer (A') constituted of from 60 through 100 parts by weight of an alkyl acrylate having $C_1$–$C_8$ alkyl group ($A_1'$), from 0 through 40 parts by weight of a monomer having copolymerizable double bond ($A_2'$), from 0 through 10 parts by weight of a polyfunctional monomer ($A_3'$) and from 0.1 through 5 parts by weight, based on 100 parts by weight of the sum of ($A_1'$) to ($A_3'$), of a grafting agent, wherein gel content of said inner layer polymer (A') is 60% by weight or higher and its proportion to said polymer [II] is larger than 46% by weight and not larger than 90% by weight;
(B') an outer layer polymer (B') constituted of from 60 through 100 parts by weight of an alkyl methacrylate having $C_1$–$C_4$ alkyl group ($B_1'$) and from 0 through 40 parts by weight of a monomer having copolymerizable double bond ($B_2'$), wherein the proportion of said outer layer polymer (B') to said polymer [II] is lower than 54% by weight and not lower than 10% by weight.

2. A thermoplastic resin composition according to claim 1, wherein the proportions of said inner layer polymer (A) and said outer layer polymer (B) to said multi-layer structure polymer [I] are from 10 through 40% by weight and from 55 through 85% by weight, respectively, and the following layer (C) exists between layer (A) and layer (B):
(C) at least one intermediate layer (C) which is a polymer constituted of from 10 through 90 parts by weight of an alkyl methacrylate having $C_1$–$C_4$ alkyl group ($C_1$), from 10 through 90 parts by weight of an alkyl acrylate having $C_1$–$C_8$ alkyl group ($C_2$), from 0 through 20 parts by weight of a monomer having copolymerizable double bond ($C_3$), from 0 through 10 parts by weight of a polyfunctional monomer ($C_4$) and from 0.1 through 5 parts by weight, per 100 parts by weight of the sum of ($C_1$) to ($C_4$), of a grafting agent, wherein the proportion of said intermediate layer (C) to said polymer [I] is from 5 through 35% by weight.

3. A thermoplastic resin composition according to claim 2, wherein the proportions of said inner layer polymer (A') and said outer layer polymer (B') to said multi-layer structure polymer [II] are from 50 through 80% by weight and from 15 through 45% by weight, respectively, and the following layer (C') exists between layer (A') and layer (B'):
(C') at least one intermediate layer (C') which is a polymer constituted of from 10 through 90 parts by weight of an alkyl methacrylate having $C_1$–$C_4$ alkyl group ($C_1'$), from 10 through 90 parts by weight of an alkyl acrylate having $C_1$–$C_8$ alkyl group ($C_2'$), from 0 through 20 parts by weight of a monomer having copolymerizable double bond ($C_3'$), from 0 through 10 parts by weight of a polyfunctional monomer ($C_4'$) and from 0.1 through 5 parts by weight, per 100 parts by weight of the sum of ($C_1'$) to ($C_4'$), of a grafting agent, wherein the proportion of said intermediate layer (C') to said polymer [II] is from 5% by weight through 35% by weight.

4. A thermoplastic resin composition according to claim 3, wherein the inner layer polymer (A) in the multi-layer structure polymer [I] has a double layer structure containing a core polymer, the proportion of which in the inner layer polymer (A) is from 5% by weight through 35% by weight.

5. A thermoplastic resin composition according to claim 3, wherein the inner layer polymer (A') in the multi-layer structure polymer [II] has a double layer structure containing a core polymer, the proportion of which in the inner layer polymer (A') is from 5% by weight through 45% by weight.

6. A thermoplastic resin composition according to claim 3, wherein the inner layer polymer (A) in the multi-layer structure polymer [I] has a double layer structure containing a core polymer, the proportion of which in the inner layer polymer (A) is from 5% by weight through 35% by weight and the inner layer polymer (A') in the multi-layer structure polymer [II] has a double layer structure containing a core polymer, the proportion of which in the inner layer polymer (A') is from 5% by weight through 45% by weight.

7. A thermoplastic resin composition obtained by compounding from 1 through 99 parts by weight of a thermoplastic resin composition according to any one of claims 1 to 6 with from 99 through 1 part by weight of at least one polymer selected from the following group (i) or (ii) or with from 99 through 1 part by weight of a mixture consisting of at least one polymer selected from group (i) and at least one polymer selected from group (ii):

polymer (i): Homopolymers of the monomers having the following general formula (a), (b) or (c) and copolymers consisting of two or more of these monomers:

$$CH_2=CXY \qquad (a)$$

wherein X and Y are either of H, Cl, F, Br, $CH_3$, COOH, $COOCH_3$, CN, $OCOCH_3$, $C_6H_5$, alkoxy group, $OCCH_3$ and $SO_3H$, $$CF_2=CFZ \qquad (b)$$

wherein Z is either of H, F, Cl and $CF_3$, $$CH_2=\underset{CH_3}{\overset{|}{C}}-COOR \qquad (c)$$

wherein R is fluoroalkyl group;

polymer (ii): Polycarbonates, thermoplastic polyesters and polyamides.

8. A film-formed or sheet-formed molded product having a thickness of 1 mm or less obtained by forming, into film or sheet, a thermoplastic resin composition according to any one of claims 1–6.

9. A thermoplastic resin composition consisting of from 1 through 99 parts by weight of at least one multi-layer structure polymer [I] and from 99 through 1 part by weight of at least one multi-layer structure polymer [II], said polymer [I] and polymer [II] having the following structures:

multi-layer structure polymer [I]:
a particulate multi-layer structure polymer comprising the following (A), (B) and (C):
(A) an inner layer polymer (A) constituted of from 60 through 100 parts by weight of an alkyl acrylate having $C_1$–$C_8$ alkyl group ($A_1$); from 0 through 40 parts by weight of a copolymerizable double bond monomer ($A_2$) selected from the group consisting of alkyl methacrylates having $C_1$ to $C_4$ alkyl group, (meth)acrylic acid derivatives such as lower alkoxy acrylates, cyanoethyl acrylate, (meth)acrylic acid, (meth)acrylamide, styrenes and (meth)acrylonitrile; from 0 through 10 parts by weight of a polyfunctional monomer ($A_3$) selected from the group consisting of ethylene glycol dimethacrylate, propylene glycol dimethacrylate, 1,3-butylene glycol dimethacrylate, 1,4-butylene glycol dimethacrylate, divinylbenzene and alkylene glycol diacrylate; and from 0.1 through 5 parts by weight, per 100 parts by weight of the sum of ($A_1$) to ($A_3$), of a grafting agent selected from the group consisting of allyl esters, methallyl esters and crotyl esters of $\alpha,\beta$-unsaturated mono- and di-carboxylic acids, triallyl cyanurate and triallyl isocyanurate; wherein gel content of said inner layer polymer (A) is 60% by weight or higher and its proportion to said polymer [I] is from 5% by weight through 46% by weight;

(B) an outer layer polymer (B) constituted of from 60 through 100 parts by weight of an alkylmethacrylate having $C_1$–$C_4$ alkyl group ($B_1$); and from 0 through 40 parts by weight of a copolymerizable double bond monomer ($B_2$), selected from the group consisting of alkyl acrylates having $C_1$ to $C_8$ alkyl group, (meth)acrylic acid derivatives such as lower alkoxy acrylates, cyanoethyl acrylate, (meth)acrylic acid, (meth)acrylamide, styrenes and (meth)acrylonitrile; wherein the proportion of said outer layer polymer (B) to said polymer [I] is from 54% by weight through 95% by weight;

(C) at least one intermediate layer (C) which is a polymer constituted of from 10 through 90 parts by weight of an alkyl methacrylate having $C_1$–$C_4$ alkyl group monomer ($C_1$), from 10 through 90 parts by weight of an alkyl acrylate having $C_1$–$C_8$ alkyl group ($C_2$), from 0 through 20 parts by weight of a copolymerizable double bond monomer ($C_3$), selected from the group consisting of (meth)acrylic acid derivatives such as lower alkoxy acrylates, cyanoethyl acrylate, (meth)acrylic acid, (meth)acrylamide, stryenes and (meth)acrylonitrile; from 0 through 10 parts by weight of a polyfunctional monomer ($C_4$) selected from the group consisting of ethylene glycol dimethacrylate, propylene glycol dimethacrylate, 1,3-butylene glycol dimethacrylate, 1,4-butylene glycol dimethacrylate, divinylbenzene and alkylene glycol diacrylate; and from 0.1 through 5 parts by weight, per 100 parts by weight of the sum of ($C_1$) to ($C_4$), of a grafting agent selected from the group consisting of allyl esters, methallyl esters and crotyl esters of $\alpha,\beta$-unsaturated mono- and di-carboxylic acids, triallyl cyanurate and triallyl isocyanurate; wherein the proportion of said intermediate layer (C) to said polymer [I] is from 0 through 35% by weight;

multi-layer structure polymer [II]:
a particulate multi-layer structure polymer comprising the following (A'), (B') and (C'):
(A') an inner layer polymer (A') constituted of from 60 through 100 parts by weight of an alkyl acrylate having $C_1$–$C_8$ alkyl group ($A_1'$), from 0 through 40 parts by weight of a copolymerizable double bond monomer ($A_2'$) selected from the group consisting of alkyl methacrylates having $C_1$ to $C_4$ alkyl group, (meth)acrylic acid derivatives such as lower alkoxy acrylates, cyanoethyl acrylate, (meth)acrylic acid, (meth)acrylamide, styrenes and (meth)acrylonitrile; from 0 through 10 parts by weight of a polyfunctional monomer ($A_3'$) selected from the group consisting of ethylene glycol dimethacrylate, propylene glycol dimethacrylate, 1,3-butylene glycol dimethacrylate, 1,4-butylene glycol dimethacrylate, divinylbenzene and alkylene glycol diacrylate; and from 0.1 through 5 parts by weight, based on 100 parts by weight of the sum of ($A_1'$) to ($A_3'$), of a grafting agent selected from the group consisting of allyl esters, methallyl esters and crotyl esters of $\alpha,\beta$-unsaturated mono- and di-carboxylic acids, triallyl cyanurate and triallyl isocyanurate; wherein gel content of said inner layer polymer (A') is 60% by weight or higher and its proportion to said polymer [II] is larger than 46% by weight and not larger than 90% by weight;

(B') an outer layer polymer (B') constituted of from 60 through 100 parts by weight of an alkyl methacrylate having $C_1$–$C_4$ alkyl group ($B_1'$) and from 0 through 40 parts by weight of a copolymerizable double bond monomer ($B_2'$) selected from the group consisting of alkyl acrylates having $C_1$ to $C_8$ alkyl group, (meth)acrylic acid derivatives such as lower alkoxy acrylates, cyanoethyl acrylate, (meth)acrylic acid, (meth)acrylamide, styrenes and (meth)acrylonitrile; wherein the proportion of said outer layer polymer (B') of said polymer [II] is lower than 54% by weight and not lower than 10% by weight;

(C') at least one intermediate layer (C') which is a polymer constituted of from 10 through 90 parts by weight of an alkyl methacrylate having $C_1$–$C_4$ alkyl group ($C_1'$); from 10 through 90 parts by weight of an alkyl acrylate having $C_1$–$C_8$ alkyl group ($C_2'$); from 0 through 20 parts by weight of a copolymerizable double bond monomer ($C_3'$) selected from the group consisting of (meth)acrylic acid derivatives such as lower alkoxy acrylates, cyanoethyl acrylate, (meth)acrylic acid, (meth)acrylamide, stryenes and (meth)acrylonitrile; from 0 through 10 parts by weight of a polyfunctional monomer ($C_4'$) selected from the group consisting of ethylene glycol dimethacrylate, propylene glycol dimethacrylate, 1,3-butylene glycol dimethacrylate, 1,4-butylene glycol dimethacrylate, divinylbenzene and alkylene glycol diacrylate; and from 0.1 through 5 parts by weight, per 100 parts by weight of the sum of ($C_1'$) to ($C_4'$), of a grafting agent selected from the group consisting of allyl esters, methallyl esters and crotyl esters of $\alpha,\beta$-unsaturated mono- and di-carboxylic acids, triallyl cyanurate and triallyl isocyanurate; wherein the proportion of said intermediate layer (C') to said polymer (II) is from 0% by weight through 35% by weight.

10. The thermoplastic resin composition of claim 9, wherein the proportions of said inner layer polymer (A), said outer layer polymer (B) and said intermediate layer (C) to said multi-layer structure polymer [I] are from 10 through 40% by weight, from 55 from 85% by weight and from 5 through 35% by weight, respectively.

11. The thermoplastic resin compositions of claim 10, wherein the proportions of said inner layer polymer (A'), said outer layer polymer (B') and said intermediate layer (C') to said multi-layer structure polymer [II] are from 50 through 80% by weight, from 15 through 45% by weight and from 5 through 35% by weight, respectively.

* * * * *